United States Patent [19]

Ura et al.

[11] Patent Number: 4,700,666
[45] Date of Patent: Oct. 20, 1987

[54] INDUCTION SYSTEM FOR INTERNAL COMBUSTION ENGINE

[75] Inventors: Syouzabu Ura, Fujisawa; Tsutomu Kikuchi; Makoto Yasuda, both of Yokohama, all of Japan

[73] Assignee: Nissan Motor Co., Ltd., Yokohama, Japan

[21] Appl. No.: 848,489

[22] Filed: Apr. 7, 1986

[30] Foreign Application Priority Data

Apr. 11, 1985 [JP] Japan .............................. 60-52745[U]

[51] Int. Cl.⁴ ............................................. F02B 27/02
[52] U.S. Cl. ......................... 123/52 MB; 123/52 MV
[58] Field of Search ........ 123/52 M, 52 MB, 585–589

[56] References Cited

U.S. PATENT DOCUMENTS

| 4,064,696 | 12/1977 | Cser | 123/52 M |
| 4,361,119 | 11/1982 | Endo et al. | 123/52 M |
| 4,494,493 | 1/1985 | Morikawa et al. | 123/52 MB |
| 4,545,331 | 10/1985 | Ito et al. | 123/52 M |
| 4,622,926 | 11/1986 | Rutschmann et al. | 123/52 MV |

FOREIGN PATENT DOCUMENTS

| 55-57641 | 4/1980 | Japan . | |
| 52651 | 3/1982 | Japan | 123/52 MB |
| 2168752 | 6/1986 | United Kingdom | 123/52 MB |

Primary Examiner—Craig R. Feinberg
Attorney, Agent, or Firm—Schwartz, Jeffery, Schwaab, Mack, Blumenthal & Evans

[57] ABSTRACT

In an induction system having two independent air supply lines for supplying air to two groups of engine cylinders of which firing orders are respectively discontinuous, an additional air supply passage bypassing throttle valves of the respective air supply lines has a bifurcated downstream end fluidly connected to the air supply lines.

3 Claims, 5 Drawing Figures

INDUCTION SYSTEM FOR INTERNAL COMBUSTION ENGINE

BACKGROUND OF THE INVENTION

1. Field of the Invention

The present invention relates to an induction system for an internal combustion engine, particularly of the kind having an additional air supply passage for supplying additional air to collectors upon idling, etc. of an engine.

2. Description of the Prior Art

A prior art induction system includes two collectors for supplying air to two groups of cylinders of which firing orders are respectively discontinuous, a bypass passage or additional air supply passage bypassing a throttle valve for supplying additional air to one of the collectors and a balance hole formed in a partition wall between the collectors for supplying additional air to the other collector.

A disadvantage of the prior art induction system is that since the additional air supply passage is directly communicated with one of the collectors but indirectly with the other collector, additional air flows into the one collector easily and efficiently but not into the other collector, tending to result in uneven distribution of additional air to the collectors, unstable idling of the engine, deteriorated fuel consumption, etc.

SUMMARY OF THE INVENTION

In accordance with the present invention, there is provided a novel and improved induction system for an internal combustion engine. The engine includes two groups of cylinders of which firing orders are respectively discontinuous. The induction system comprises a first collector for supplying air to the first group of cylinders, a second collector for supplying air to the second group of cylinders, a first main air supply passage fluidly connected to said first collector to form a first air supply line, a second main air supply passage fluidly connected to said second collector to form a second air supply line independent from said first air supply line, a first throttle valve disposed in said first main air supply passage, a second throttle valve disposed in said second main air supply passage, an addition air supply passage bypassing the first and second throttle valves for supplying additional air to the first and second collectors, the additional air supply passage having a bifurcated downstream end fluidly connected to said first and second air supply lines, and an additional air control valve disposed in the additional air supply passage for controlling airflow therethrough.

The above structure is quite effective for overcoming the above noted disadvantages and shortcomings inherent in the prior art arrangements.

It is accordingly an object of present invention to provide an novel and improved induction system for an internal combustion engine which can evenly or equally distribute additional air to two groups of engine cylinders assuredly.

It is another object of the present invention to provide a novel and improved induction system of the above described character which can improve the stability in idling of the engine.

It is a further object of the present invention to provide a novel and improved induction system of the above described character which can improve the fuel consumption.

BRIEF DESCRIPTION OF THE DRAWINGS

The features and advantages of the induction system of the present invention will become more clearly appreciated from the following description taken in conjunction with the accompanying drawings, in which.

DETAILED DESCRIPTION OF THE PREFERRED EMBODIMENTS

Figure 1:
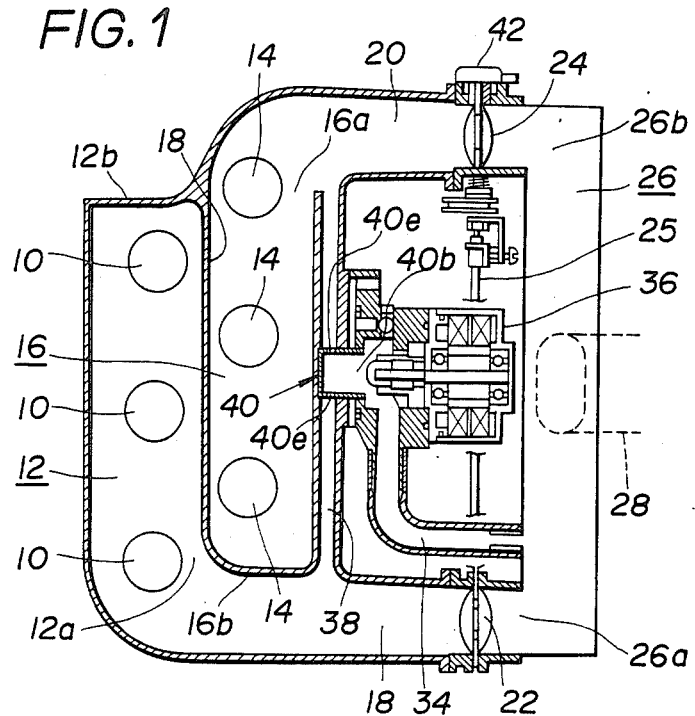
FIG. 1 is a sectional plan view of an induction system of the present invention.
Figure 2:
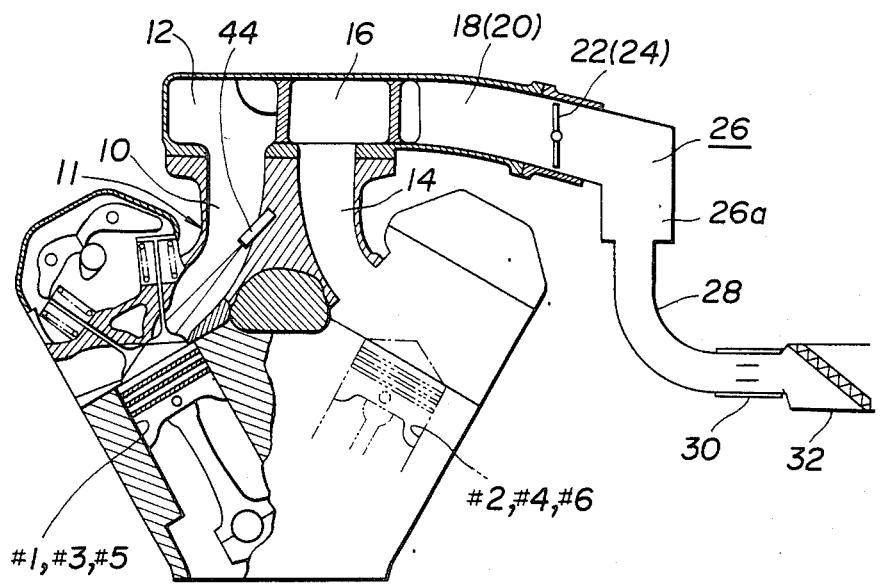
FIG. 2 is a sectional elevational view of the induction system of FIG. 1 together witha Vee-six internal combustion engine.
Figure 3:
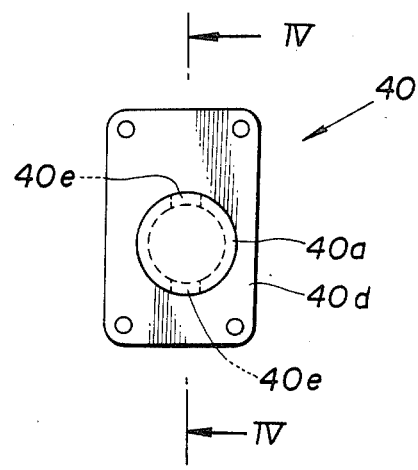
FIG. 3 is an enlarged plan view of a balance tube employed in the induction system of FIG. 1.
Figure 4:
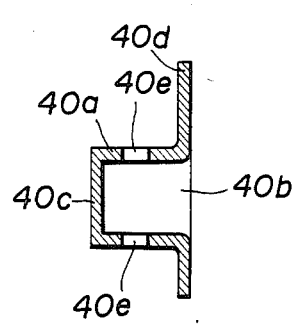
FIG. 4 is a sectional view taken along the line IV—IV of FIG. 3.
Figure 5:
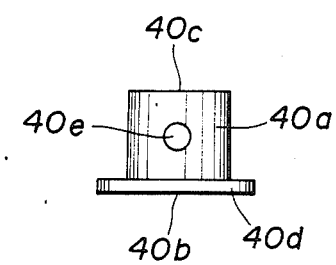
FIG. 5 is a side elevational view of the balance tube of FIG. 3.

Referring to FIGS. 1 through 5, inclusive, an internal combustion engine is shown as of a Vee-six type having a first group of cylinders #1, #3, #5 shown in the left-hand part of FIG. 2 and a second group of cylinders #2, #4, #6 shown in the right-hand part of the same figure. The cylinders are so grouped as to be respectively discontinous in firing order.

The first group of cyliners #1, #3, #are fluidly connected via passages 10 of intake manifold 11 to a first collector 12, while the second group of cylinders #2, #4, #6 are fluidly connected via passages 14 of the intake manifold 11 to a second collector 16.

The first and second collectors 12, 16 are elongated in parallel to each other so as to be separted by a common partition wall 18 and have open ends 12a, 16a and closed ends 12b, 12b which are arranged reversely to each other, i.e., the open end 12a or 16a of one of the collectors 12 or 16 is located adjacent the closed end 16b or 12b of the other collector 16 or 12.

The first collector 12 is fluidly connected at the open end 12a thereof to a first main air supply passage 18, while the second collector 16 is fluidly connected at the open end 16a thereof to a second main air supply passage 20, so that two independent air supply lines are formed. The first and second main air suply passages 18, 20 are elongated in parallel to each other and in such manner as to intersect the longitudinal axes of the collectors 12, 16 at right angles. Within the first and second main air supply passages 18, 20 there are respectively disposed first and second throttle valves 22, 24 which are interconnected by a shaft 25 for synchronously controlling airflow therethrough. The upstream ends of the first and second air supply passages 18, 20 are fluidly connected to an air surge tank 26. The air surge tank 26 is elongated in parallel to the first and second collectors 12, 16 or elongated in the direction intersecting the first and second main air supply passages 18, 20 at right angles so as have two downstream ends 26a, 26b where it is connected to the main air supply passages 18, 20. The air surge tank 26 has at a location intermediate between the downstream ends 26a, 26b thereof an unstream end 26c where it is fluidly connected to an air duct 28 which is in turn connected through an air flow meter 30 to an air cleaner 32.

An additional air supply passage 34 bypassing the throttle valves 22, 24 has disposed therein an additional air control valve 36 and is fluidly connected at an upstream end thereof to the air surge tank 26 while being separated or bifurcated at an downstream end thereof to form a balance passage 38 which elongates in parallel to the first and second collectors 12, 16 and has opposed ends fluidly connected to the first and second main air supply passages 18, 20, respectively.

The biburcated downstream end of the additional air passage 34, i.e., the balance passage 38 has disposed therein at the approximately central portion thereof a balance tube 40. The balance tube 40, as shown in detail in FIGS. 3 to 5, consists of a tubular main body 40a with an open end 40b and a closed end 40c and an outward installation flange 40d at the open end 40b. The tubular main body 40a is formed at the circumferential peripheral wall thereof with a pair of diametrically opposed balance holes 40e. The balance tube 40 is arranged in such a manner as to communicate at the open end 40b with the upstream end side of the additional air supply passage 38 and at the balance holes 40e with the balance passage 38.

In the meantime, indicated by the reference numeral 42 in FIG. 1 is a throttle switch and by 44 in FIG. 2 a fuel injector.

With the induction system described as above, air drawn in through the air cleaner 32 and having reached the air surge tank 26 is separated thereat to flow partly toward the first main air supply passage 18 and partly toward the second main air supply passage passage 20. Upon opening of the throttle valves 22, 24, the air flows through the first and second main air supply passages 18, 20 into the first and second collectors 12, 16 and is supplied through the passages 10, 14 of the intake manifold 11 to the first and second groups of cylinders #1-#6 together with fuel injected by the fuel injector 44.

On the other hand, upon opening of the additional air control valve 36, air flows from the surge tank 26 into the additional air supply passage 34 and evenly or equally separated at the balance tube 40 to partly flow through one of the balance holes 40e toward one end of the balance passage 38 and partly flow through the other balance hole 40e toward the other end of the balance passage 38. Thenceforth, the air flows through the opposed ends of the balance passage 38 and the first and second main air supply passages 18, 20 into the first and second collectors 12, 16 and is supplied through the passages 10, 14 of the intake manifold 11 to the first and second groups of cylinders #1-#6 together with fuel injected by the fuel injector 44.

What is claimed is:

1. An induction system for an internal combustion engine having first and second groups of cylinders of which firing orders are respectively discontinuous, comprising:
    a first collector for supplying air to the first group of cylinders;
    a second collector for supplying air to the second group of cylinders, said first and second collectors being elongated in parallel to each other and having open ends and closed ends which are arranged reversely to each other;
    a first main air supply passage fluidly connected to said first collector to form a first air supply line;
    a second main air supply passage fluidly connected to said second collector to form a second air supply line independent from said first air supply line, said first and second main air supply passages being elongated in the direction transversing the longitudinal axes of said collectors and having downstream ends in communication with said open ends of said first and second collectors;
    a first throttle valve disposed in said first main air supply passage;
    a second throttle valve disposed in said second main air supply passage;
    an additional air supply passage bypassing said first and second throttle valves for supplying additional air to said first and second collectors, said additional air supply passage having a bifurcated downstream end fluidly connected to said first and second air supply lines, said bifurcated downstream end constituted by a balance passage having opposed ends fluidly connected to said first and second main air passages, said balance passage being elongated in parallel to said first and second collectors and having a balance tube comprising a tubular main body with an open end and a closed end and an outward flange at the open end, said tubular main body having at the circumferential peripheral wall thereof a pair of diametrically opposed balance holes, said balance tube being disposed in said balance passage at an approximately central portion thereof in such a manner as to communicate at said open end with an upstream end side of said additional air supply passage and at said balance holes with said opposed ends of said balance passage; and
    an additional air control valve disposed in said additional air supply passage for controlling air flow therethrough.

2. An induction system as set forth in claim 1, further comprising an air surge tank elongated in the direction transversing said first and second main air supply passages and having longitudinally opposed two downstream ends fluidly connected to upstream ends of said main air supply passages, respectively, said additional air supply passage having an upstream end fluidly connected to said air surge tank.

3. An induction system as set forth in claim 2, further comprising an air cleaner and an airflow meter downstream of said air cleaner, in which said air surge tank has at a location intermediate between said downstream ends thereof an upstream end fluidly connected through said airflow meter to said air cleaner.

* * * * *